United States Patent
Patmont et al.

(10) Patent No.: US 6,609,584 B2
(45) Date of Patent: Aug. 26, 2003

(54) ELECTRICALLY INTEGRATED SCOOTER WITH DUAL SUSPENSION AND STOWAGE MECHANISM

(75) Inventors: Steven J Patmont, Pleasanton, CA (US); Timothy Chow, Norwich, VT (US)

(73) Assignee: Patmont Motor Werks, Pleasanton, CA (US)

( * ) Notice: Subject to any disclaimer, the term of this patent is extended or adjusted under 35 U.S.C. 154(b) by 0 days.

(21) Appl. No.: 09/946,751

(22) Filed: Sep. 5, 2001

(65) Prior Publication Data

US 2002/0029919 A1 Mar. 14, 2002

Related U.S. Application Data

(62) Division of application No. 09/384,854, filed on Aug. 27, 1999, now Pat. No. 6,347,681.

(51) Int. Cl.[7] ............................................. B62K 11/10
(52) U.S. Cl. ....................... 180/220; 180/221; 180/225; 180/227; 180/65.3; 280/87.041
(58) Field of Search ................................. 180/219, 220, 180/227, 228, 180, 181, 65.1, 65.2, 65.8, 65.3, 221, 225; 280/87.01, 87.021, 87.03, 87.041, 281.1

(56) References Cited

U.S. PATENT DOCUMENTS

| | | |
|---|---|---|
| 3,731,168 A | 5/1973 | Strifler |
| 4,331,013 A | 5/1982 | Jaulmes |
| 4,340,125 A * | 7/1982 | Watanabe et al. ........... 180/215 |
| 4,697,664 A | 10/1987 | Kohyama ................... 180/226 |
| 4,735,277 A | 4/1988 | Prince ........................ 180/227 |
| 4,821,832 A | 4/1989 | Patmont |
| 5,228,533 A * | 7/1993 | Mitchell .................... 180/208 |
| 5,279,383 A | 1/1994 | Gustafsson ................. 180/227 |
| 5,282,517 A | 2/1994 | Prince ........................ 180/227 |
| 5,388,659 A | 2/1995 | Pepe |
| 5,390,757 A | 2/1995 | Smith ........................ 180/227 |
| 5,396,970 A | 3/1995 | Ono |
| 5,406,154 A | 4/1995 | Kawaguchi et al. |
| 5,489,002 A * | 2/1996 | Streiff ....................... 180/65.3 |
| 5,494,128 A | 2/1996 | Witthaus |
| 5,613,569 A * | 3/1997 | Sugioka et al. ............. 180/68.5 |
| 5,767,584 A * | 6/1998 | Gore et al. ................. 290/1 R |
| 5,775,452 A | 7/1998 | Patmont |
| 5,848,660 A | 12/1998 | McGreen |
| 5,894,898 A | 4/1999 | Catto |
| 5,927,733 A | 7/1999 | Banda .................... 280/87.041 |
| 6,012,539 A | 1/2000 | Patmont .................... 180/223 |
| 6,050,357 A | 4/2000 | Staelin et al. |
| 6,107,691 A | 8/2000 | Gore et al. |
| 6,199,880 B1 | 3/2001 | Favorito et al. ........ 280/87.042 |
| 6,279,929 B1 | 8/2001 | Fruechtenicht ......... 280/87.041 |
| 6,328,121 B1 * | 12/2001 | Woodbury et al. ......... 180/65.1 |
| 2001/0035621 A1 | 11/2001 | Herman et al. ........ 280/87.041 |

FOREIGN PATENT DOCUMENTS

| | | |
|---|---|---|
| EP | 0 831 019 A1 | 9/1997 |
| FR | 2733187 | 10/1996 |
| JP | 8-119180 | * 5/1996 |
| JP | 8282304 | 10/1996 |
| JP | 8300955 | 11/1996 |
| JP | 8310254 | 11/1996 |
| WO | WO 98/46474 | 10/1998 |

* cited by examiner

*Primary Examiner*—Avraham Lerner
(74) *Attorney, Agent, or Firm*—Fenwick & West LLP

(57) ABSTRACT

The present invention is an electric scooter having batteries concealed below the standing platform in a multipurpose battery pan, an anti-lock brake, a dual suspension, a stow and carry feature, integrated electronics including brake control, throttle control, safety measures and theft protection. The dual suspension scooter includes a chassis; a steering column; a front wheel rotatably mounted on a front axle assembly; a rear wheel rotatably mounted on a rear axle assembly; a front cantilevered suspension mechanism mounted between the steering column and the front axle assembly; and a rear suspension mechanism mounted between the rear end of the chassis and the rear axle assembly.

2 Claims, 12 Drawing Sheets

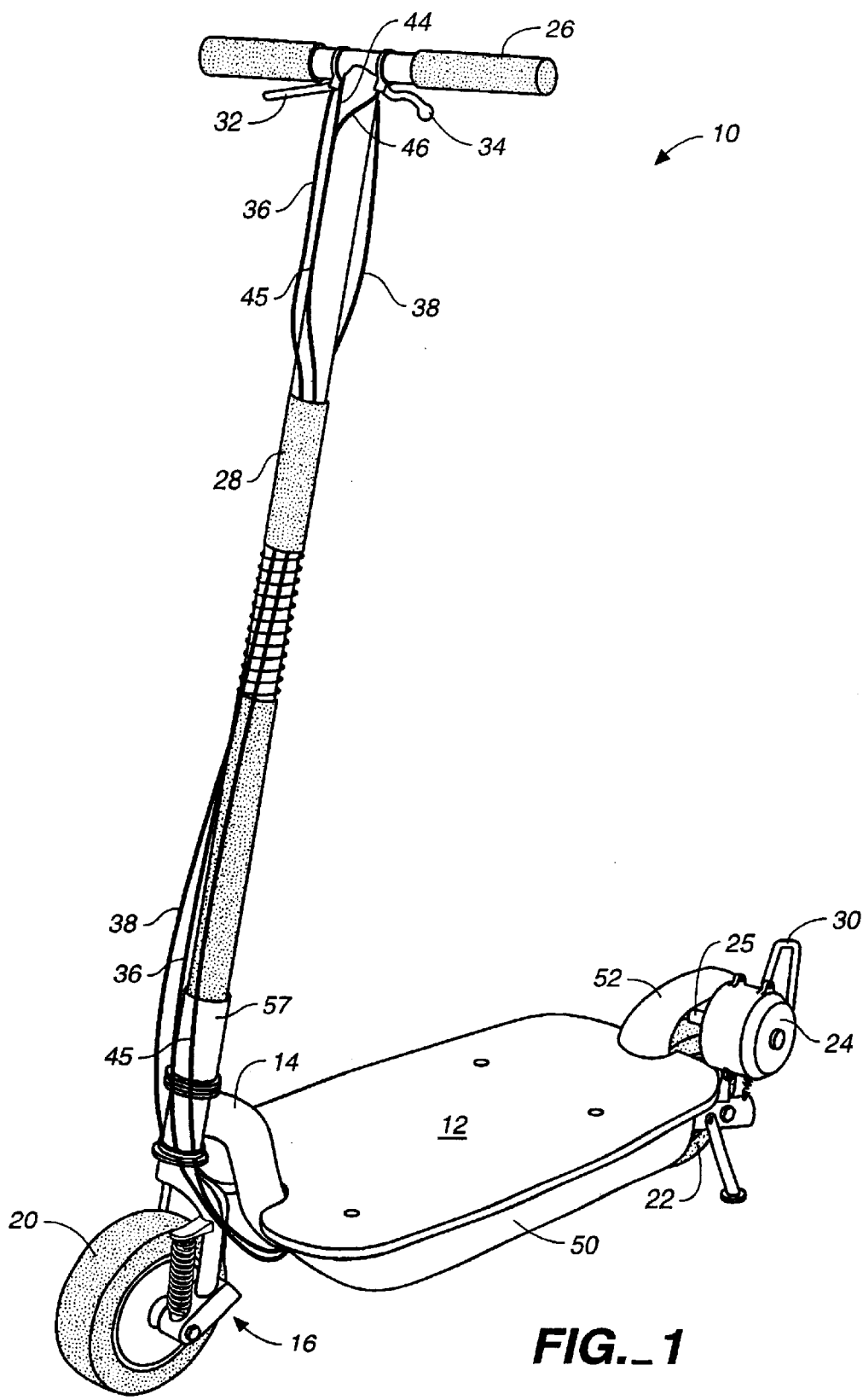
FIG._1

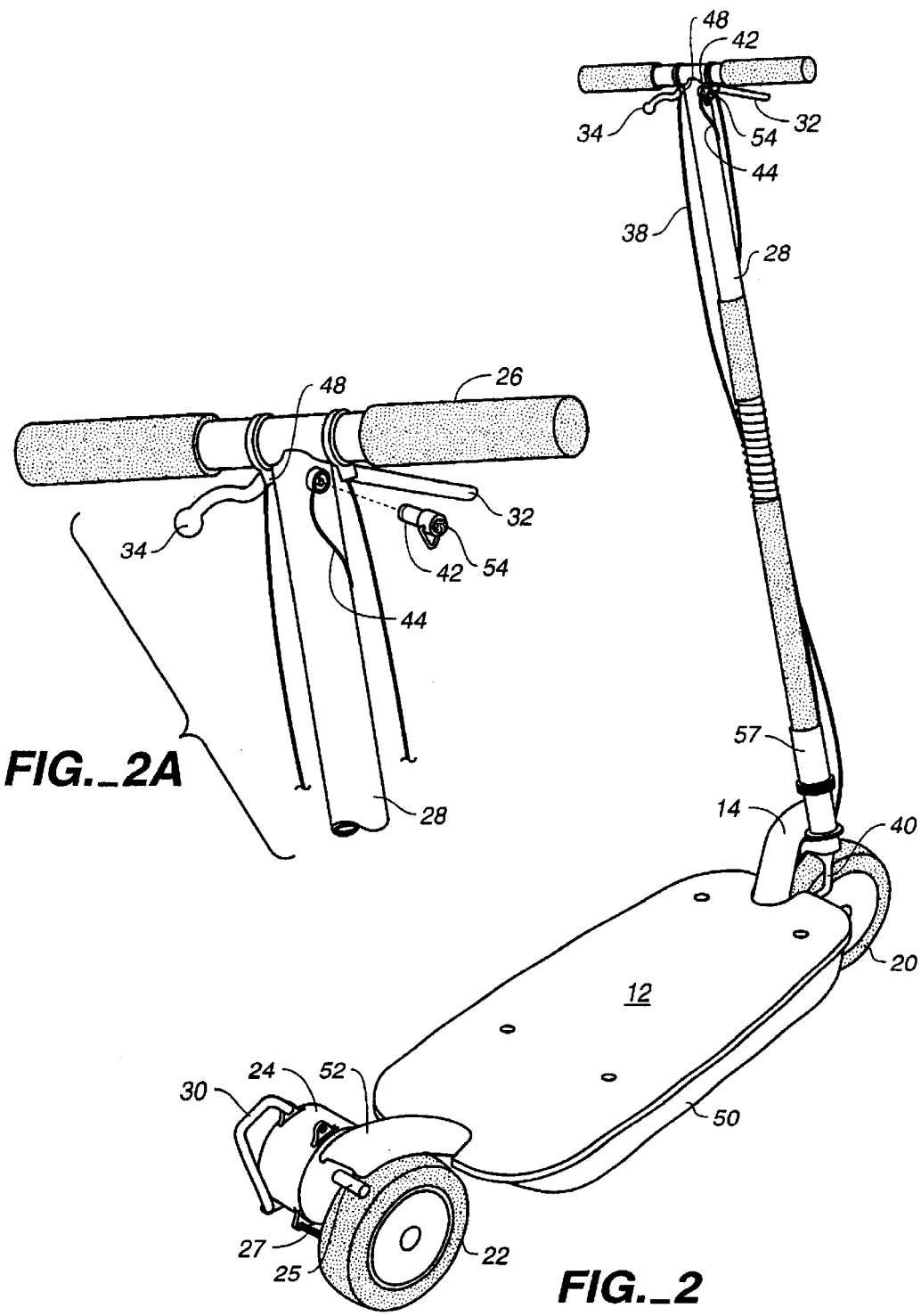

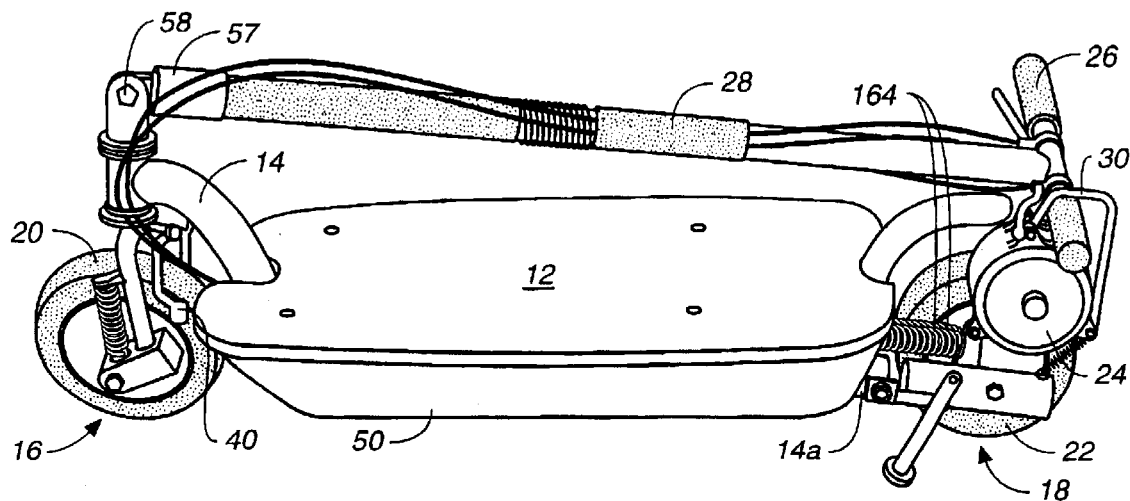
FIG._3
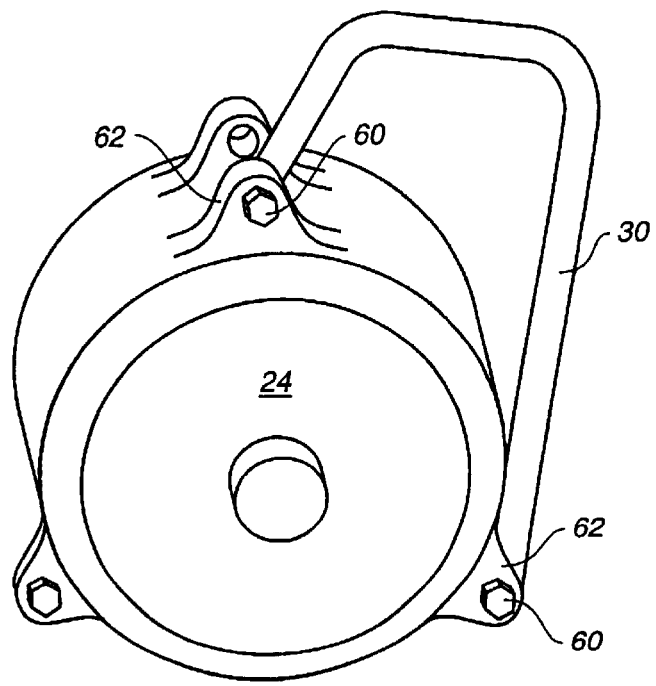
FIG._3A

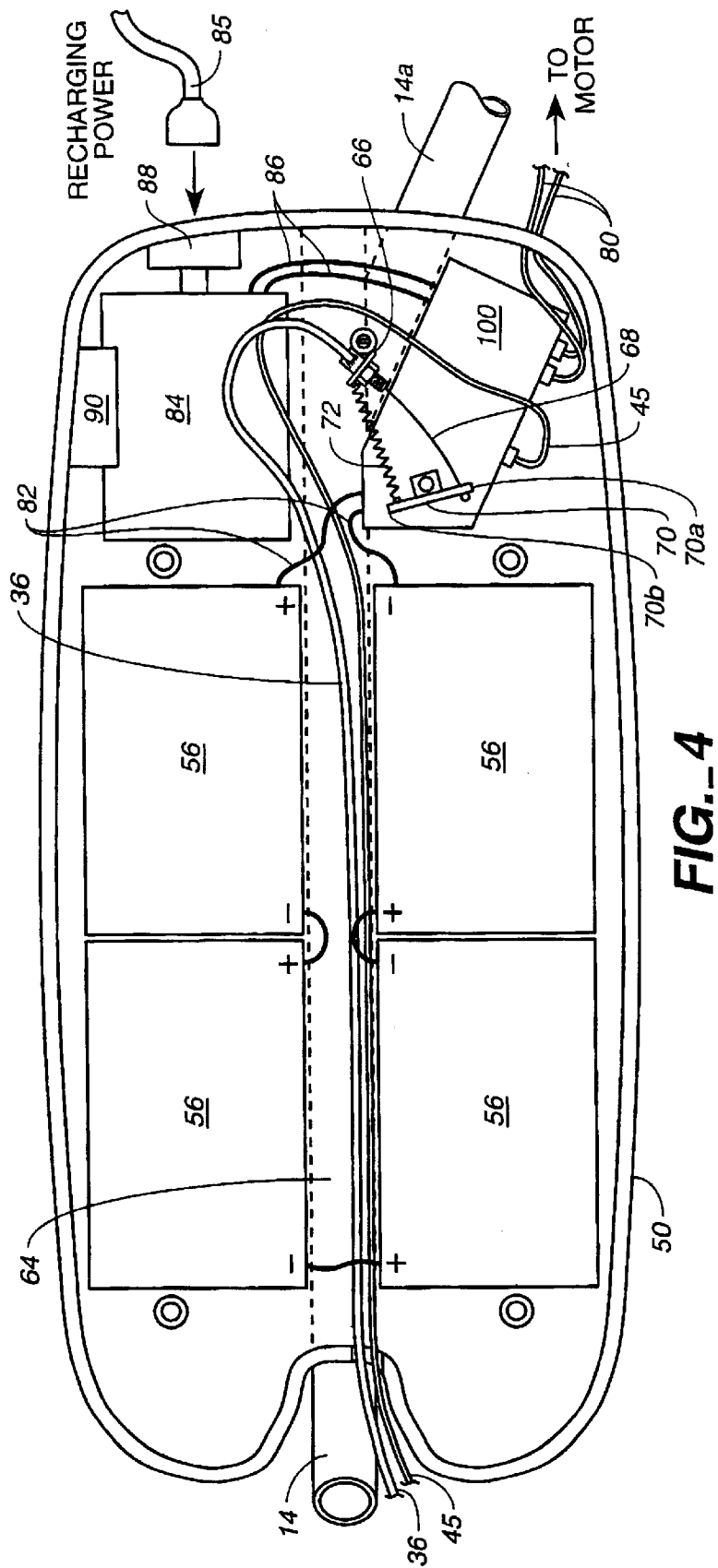
FIG._4

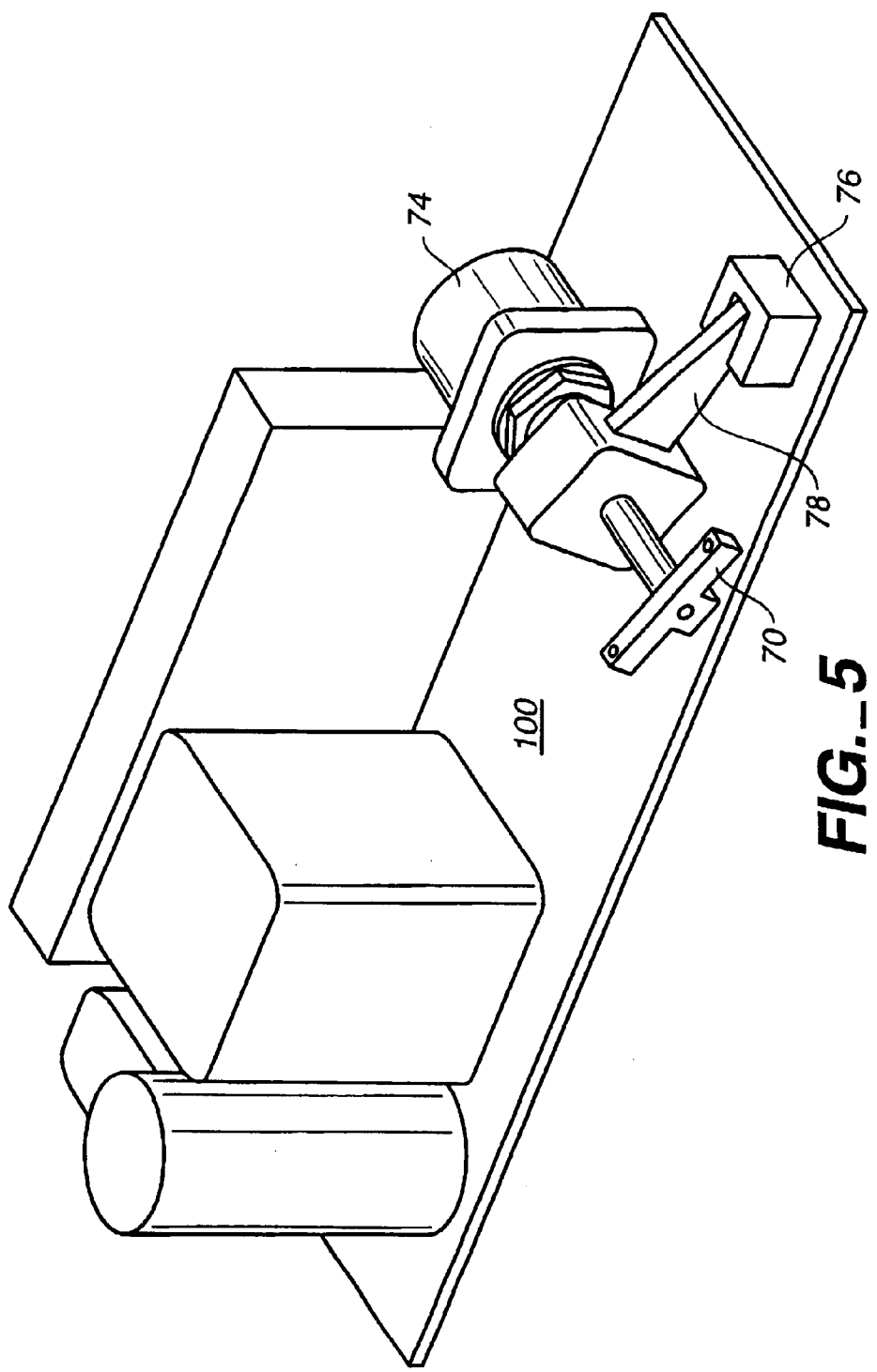
FIG._5

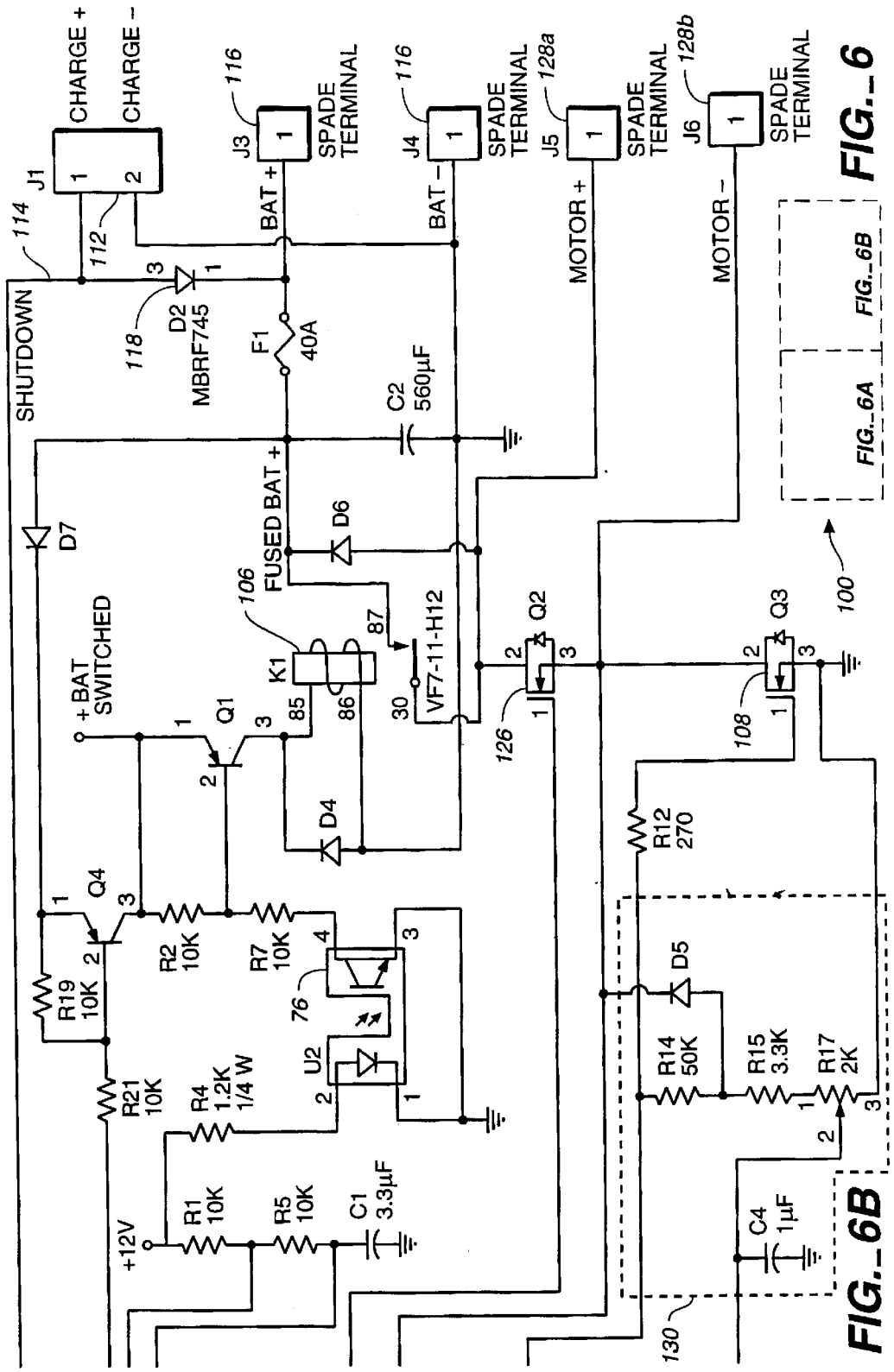

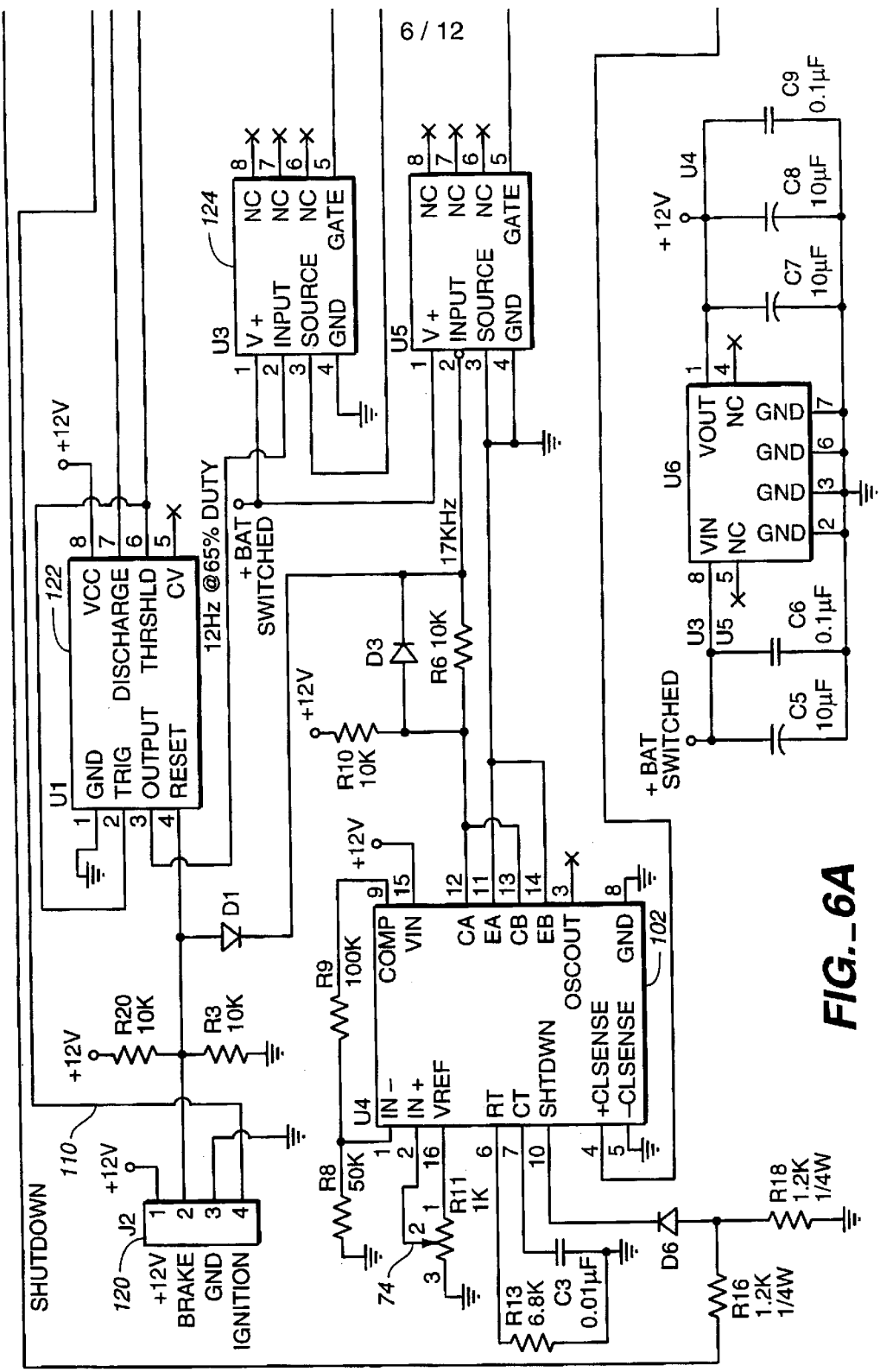
FIG._6A

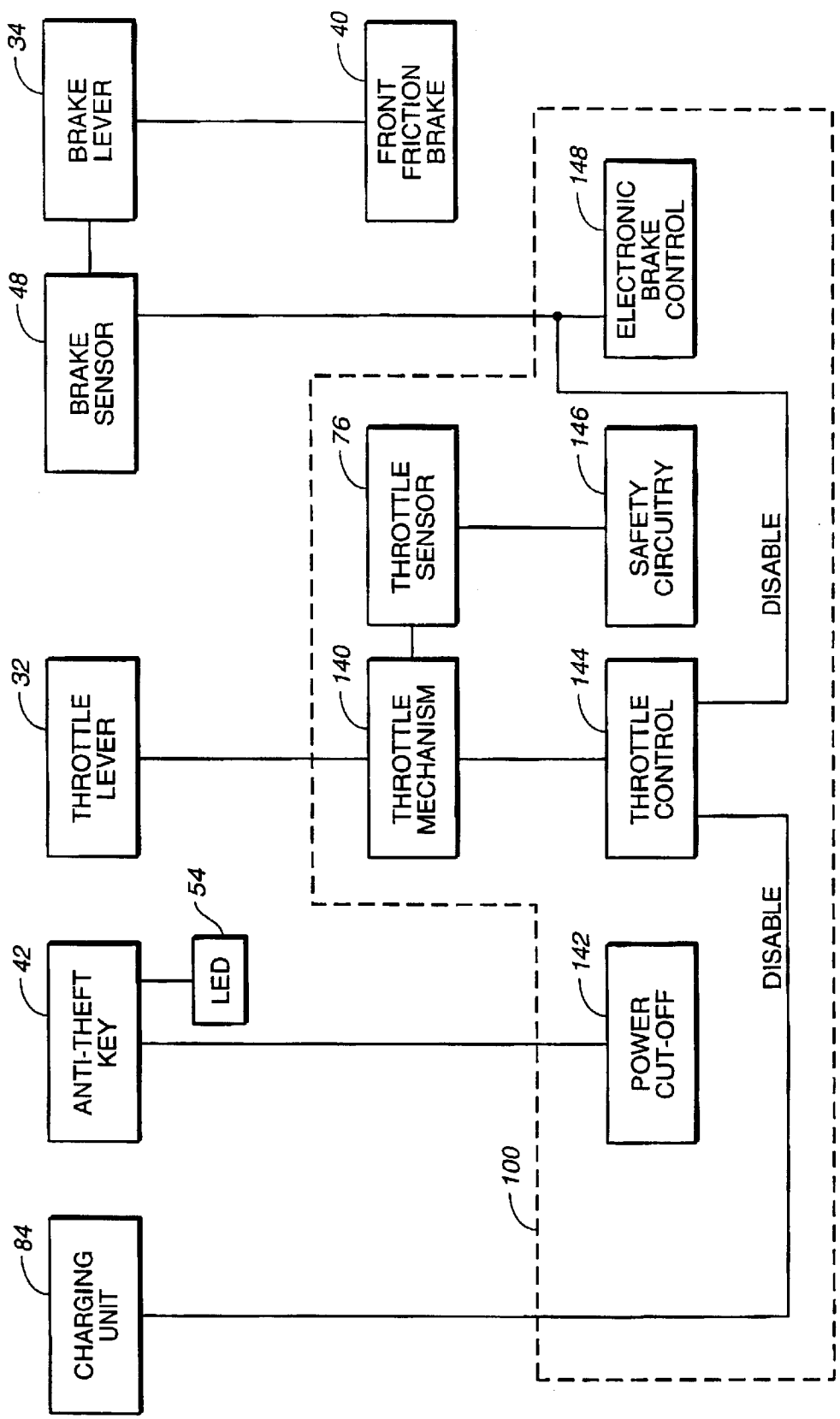

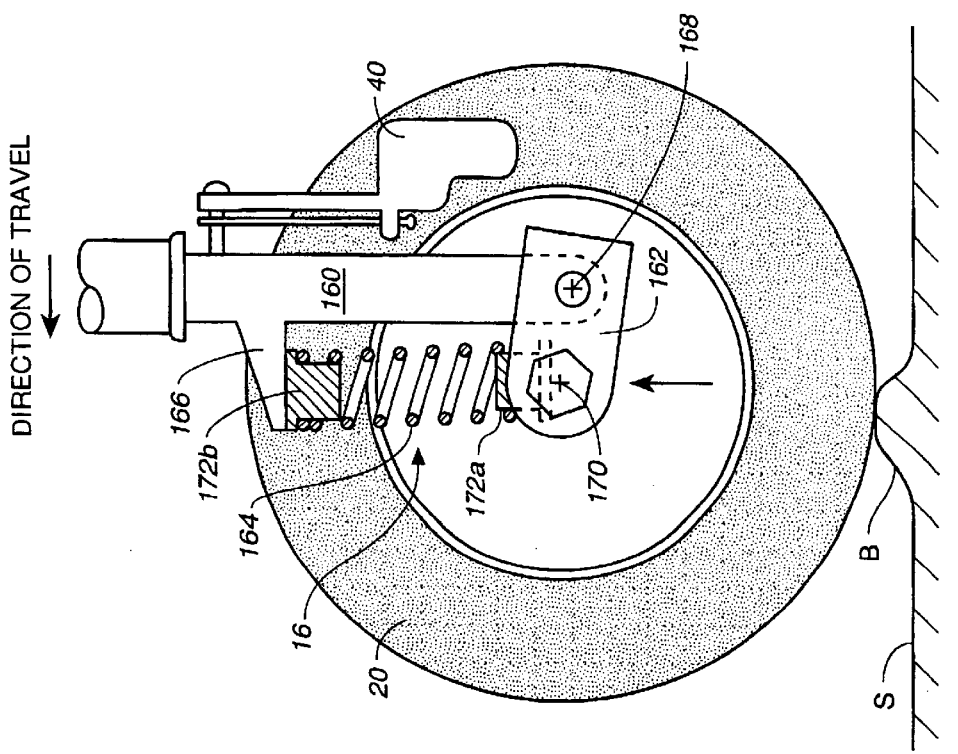
FIG._8A
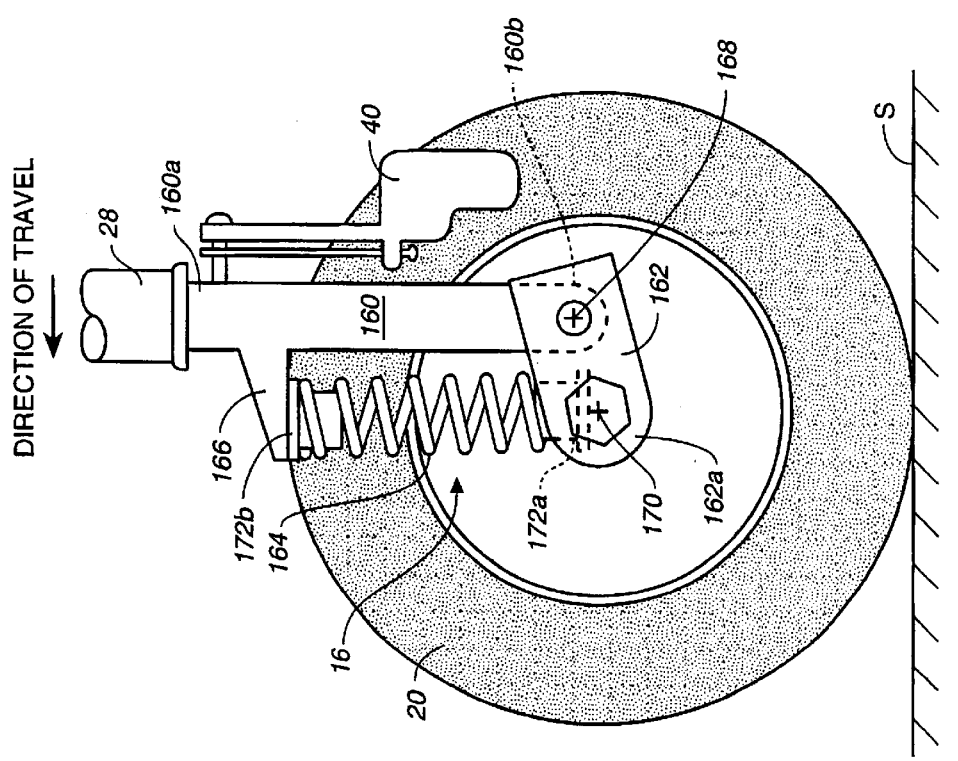
FIG._8B

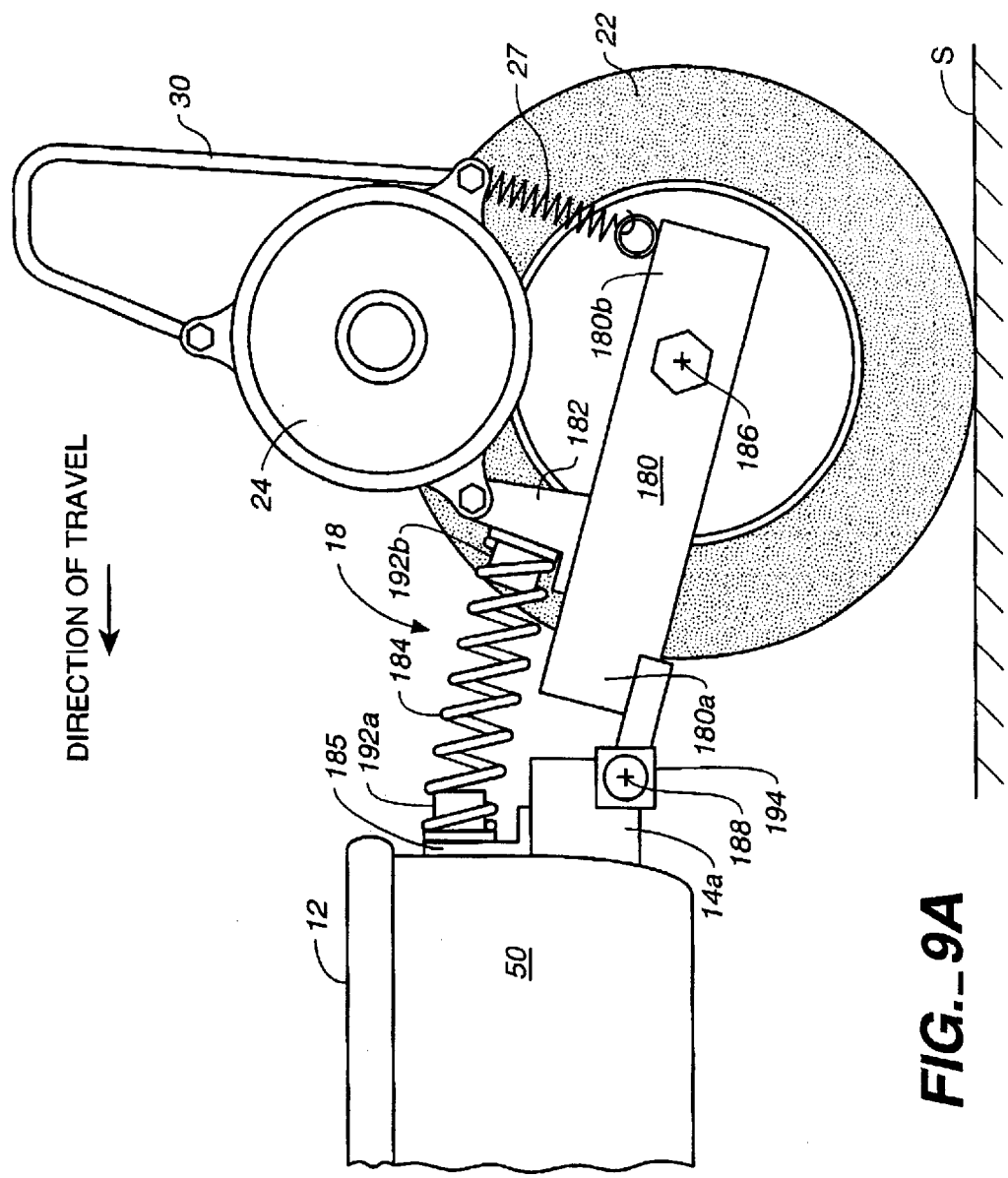
FIG._9A

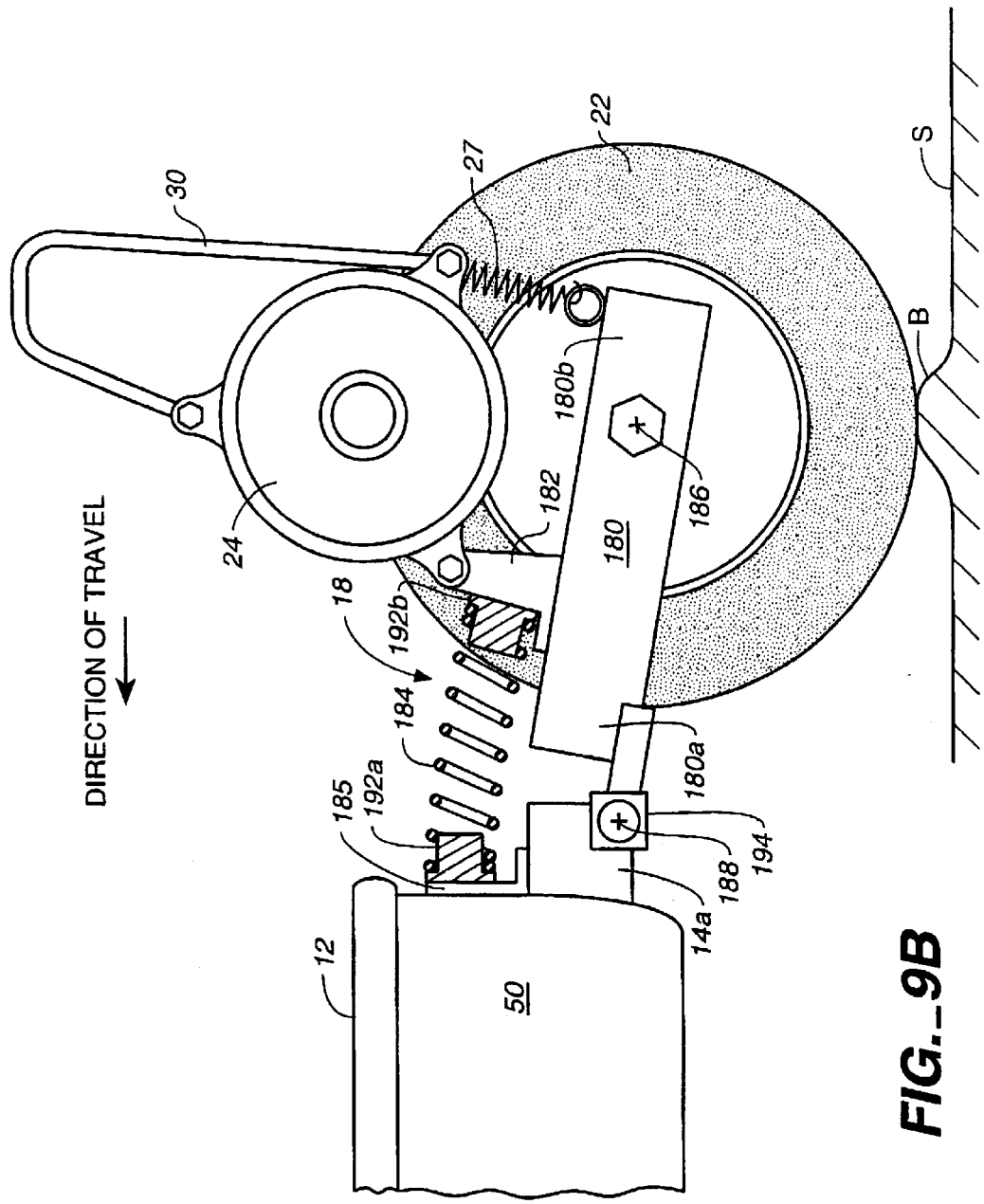
FIG._9B

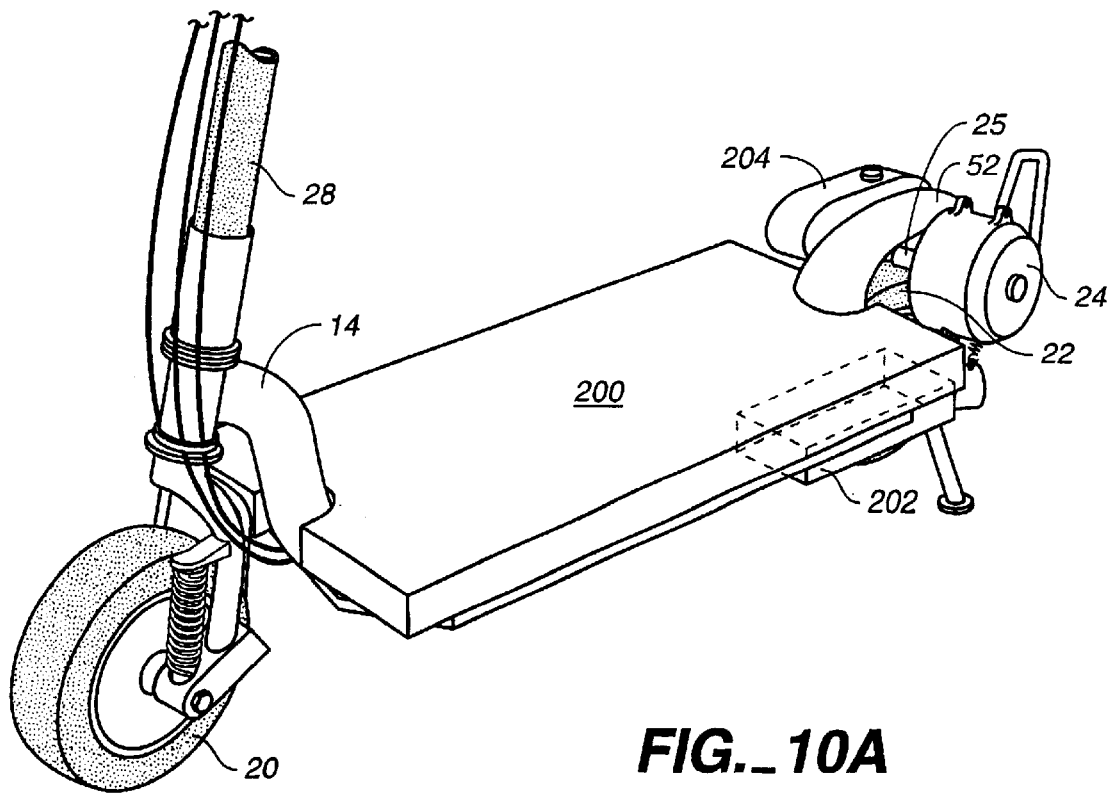
FIG._10A
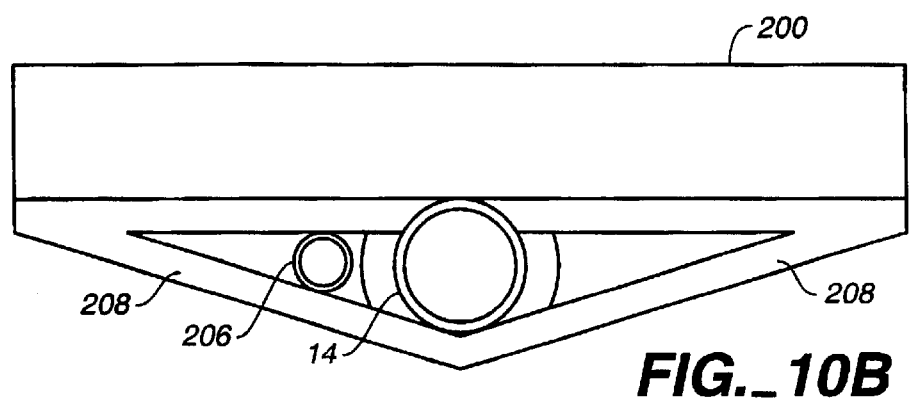
FIG._10B

ELECTRICALLY INTEGRATED SCOOTER WITH DUAL SUSPENSION AND STOWAGE MECHANISM

RELATED APPLICATION

This application is a divisional application claiming priority from application Ser. No. 09/384,854 filed on Aug. 27, 1999 now U.S. Pat. No. 6,347,681 by Steven J. Patmont and Timoth Chow.

FIELD OF THE INVENTION

The present invention relates to an electrically integrated scooter with a dual suspension and a stowage mechanism, more particularly, an electric scooter is disclosed having batteries concealed below the standing platform in a multipurpose battery pan, an anti-lock brake, a dual suspension, a stow and carry feature, integrated brake and throttle control, and an anti-theft key.

BACKGROUND OF THE INVENTION

Electric scooters are known in the art. One particular example is set forth in U.S. Pat. No. 5,775,452 entitled Electric Scooter and assigned to the assignee herein. Although electric scooters are known, none have or suggest the improved electronic features of the present invention such as batteries concealed below the standing platform in a multipurpose battery pan, an anti-lock brake, a dual suspension, a stow and carry feature, integrated electronics including brake control, throttle control, safety measures and theft protection.

Also, scooters for supporting a standing rider have utilized both pneumatic and non-pneumatic tires. The non-pneumatic tires are typically solid rubber and thus have the advantage of being hard and durable which results in tires that have a very long life, do not get flats and can have friction brakes applied directly to the tire side wall. Also, non-pneumatic tires can be made with a small diameter which allows for compact design and a large standing platform. Unfortunately, due to the hardness of the tire, non-pneumatic tires have a very rough ride. For this reason, many scooters utilize pneumatic tires, which provide a much smoother ride due to the air inside the tire. However, pneumatic tires must have a larger diameter than non-pneumatic tires in order to allow inflation and flexibility of the tire. Thus, standing scooters constructed with pneumatic tires are not as compact and have smaller standing platforms than their non-pneumatic counterparts. The present invention provides a solution to this problem that provides the benefits of non-pneumatic tires without the known drawbacks.

SUMMARY OF THE INVENTION

The present invention is an electric scooter having batteries concealed below the standing platform in a multipurpose battery pan, an anti-lock brake, a dual suspension, a stow and carry feature, integrated electronics including brake control, throttle control, safety measures and theft protection.

An object of the present invention is to provide a dual suspension scooter.

Another object of the to provide a multi-feature electric scooter where the structures which provide each function are complimentary and do not interfere with each other.

A further object of the invention is to provide a cost effective scooter with a variety of novel features.

It is also an object of the invention to provide an electric scooter with safety features for preventing unwanted or untimely acceleration of the scooter.

Another object of the to provide an electric scooter that is reliable and simple in construction.

Also, an object of the invention is to provide a scooter that is readily and easy stored in a portable manner.

Additionally, it is an object of the present invention to provide a scooter that has the benefits of non-pneumatic tires without the known drawbacks.

The present invention is an electric scooter having batteries concealed below the standing platform in a multipurpose battery pan, an anti-lock brake, a dual suspension, a stow and carry feature, integrated electronics including brake control, throttle control, safety measures and theft protection.

The integrated electronic control includes a throttle lever, wherein movement of the throttle lever is indicative of desired acceleration of the electric scooter; a brake lever; a brake sensor proximate to the brake lever, wherein the brake sensor senses the position of the brake lever; a throttle control circuit coupled between the throttle lever and the electric motor and coupled to the brake sensor, wherein the throttle control circuit controls the acceleration of the electric scooter by the electric motor based upon movement of the throttle lever and is disabled when the brake sensor senses that the brake lever is in a braking position; and an electronic brake control coupled between the brake sensor and the motor, wherein the electronic brake control causes the electric motor to act as an electric brake when the brake sensor senses that the brake lever is in a braking position.

The portable and stowable aspect of the scooter includes a chassis; a jointed steering column rotatably mounted on the front end of the chassis, where the jointed steering column folds from an upright in use position to a folded stowed position; a handle bar mounted at one end of the steering column; a front wheel rotatably mounted on another end of the steering column; a rear wheel rotatably mounted on the rear end of the scooter chassis; and a stowage hook mounted on the motor where the handlebar engages the stowage hook when the jointed steering column is in the folded stowed position.

The dual suspension scooter includes a chassis; a steering column; a front wheel rotatably mounted on a front axle assembly; a rear wheel rotatably mounted on a rear axle assembly; a front cantilevered suspension mechanism mounted between the steering column and the front axle assembly; and a rear cantilevered suspension mechanism mounted between the rear end of the chassis and the rear axle assembly.

Alternately, a fuel cell may be mounted on the chassis wherein the fuel cell provides an electric charge for accelerating the electric motor and a platform for supporting the rider of the scooter.

The present invention has other objects and advantages which are set forth in the description of the Description of the Preferred Embodiments. The features and advantages described in the specification, however, are not all inclusive, and particularly, many additional features and advantages will be apparent to one of ordinary skill in the art in view of the drawings, specification, and claims herein.

BRIEF DESCRIPTION OF THE DRAWINGS

FIG. 1 is a front perspective view of the electric scooter of the present invention.

FIG. 2 is a rear perspective view of the electric scooter of the present invention.

FIG. 2A is an enlarged exploded view of the top of steering column, steering handle and the key switch shown in FIG. 2.

FIG. 3 is a side view of the electric scooter of the present invention in the stowed and carry position.

FIG. 3A is an enlarged side perspective view of the motor and stowage mechanism shown in FIG. 3.

FIG. 4 is a top plan view of the battery pan and its contents with the riding platform removed.

FIG. 5 is an enlarged, perspective view of the throttle sensor and flag of the present invention.

FIG. 6 is a circuit diagram of the motor control circuit of the present invention.

FIG. 7 is a block diagram of the integrated electronic control of the present invention.

FIGS. 8A and 8B are side views of the front suspension mechanism of the present invention in the uncompressed normal riding position and the compressed position, respectively.

FIGS. 9A and 9B are side views of the rear suspension mechanism of the present invention in the uncompressed normal riding position and the compressed position, respectively.

FIG. 10 is a cross-sectional view of an alternate embodiment of the present invention.

DESCRIPTION OF THE PREFERRED EMBODIMENTS

The present invention is an electric scooter having batteries concealed below the standing platform in a multipurpose battery pan, an anti-lock brake, a dual suspension, a stow and carry feature, integrated electronics including brake control, throttle control, safety measures and theft protection.

Referring to FIGS. 1 and 2, electric scooter 10 is illustrated for supporting a rider on platform 12. Scooter 10 includes chassis 14 with front suspension wheel mount 16 and rear suspension wheel mount 18 for rotatably mounting front wheel 20 and rear wheel 22, respectively, to chassis 14. As better shown in FIGS. 3, 4 and 9, rear wheel 22 is mounted to angular chassis extension 14a, which is a cantilevered from chassis 14, by rear suspension wheel mount 18. Chassis may also be constructed in the manner specified in co-pending application Ser. No. 09/071,473 filed May 1, 1998 entitled All-Terrain Scooter, which is assigned to the same assignee as the present invention and incorporated herein by reference. Motor 24 is mounted to rear suspension wheel mount 18 so that when bumps B are encountered in riding surface S it travels with and is maintained in driving engagement with rear wheel 22. Also, motor shaft 25 of motor 24 is maintained in contact with rear wheel 22 by the weight of motor 24 and bias spring 27 in a similar fashion as co-pending application Ser. No. 09/058,407 filed Apr. 9, 1998 entitled Engine Drive For Scooter, which is assigned to the same assignee as the present invention and incorporated herein by reference. Mounted on motor 24 is stowage hook 30. Scooter 10 includes steering handle 26 mounted perpendicularly on steering column 28 which is coupled to front suspension wheel mount 16 and rotatably coupled to chassis 14 in order to steer front wheel 20.

Throttle lever 32 and brake lever 34 are mounted on steering handle 26, and throttle cable 36 and brake cable 38 are coupled to each of these, respectively. Brake cable 38 extends down steering column 28 and is coupled to front friction brake 40, which is mounted on front suspension wheel mount 16 (more specifically, cantilevered support 160 as shown in FIG. 8), for friction braking of front wheel 20. Key 42 (shown in better detail in FIG. 2A) is mounted on steering column 28 just below handle 26 facing the rider (see FIG. 2) and is coupled to key cable 44 which extends down steering column 28. Also, brake sensor cable 46, which is coupled to brake lever sensor 48, extends down steering column 28. Brake sensor cable 46 and key cable 44 are both enclosed in conduit 45 along with a ground wire.

Platform 12 is mounted on battery pan 50 which is in turn mounted to chassis 14. Battery pan 50 is a single assembly for ease of construction. Fender 52 extends from the rear of platform 12 over rear wheel 22 to protect the rider from dirt, debris and water that may be strewn upward by rear wheel 22.

Key 42 serves multiple functions including acting as a dead-man switch, an anti-theft device, and a power indicator. When key 42 is removed, motor 24 is disabled. Thus, key 42 may be removed in the event the rider needs to instantly disable motor 24. Also, without key 42 in place, scooter 10 will be in operative thus deterring theft. Additionally, key switch 42 is equipped with Light Emitting Diode (LED) 54 to indicate scooter 10 is energized. LED 54 is lit when key 42 is inserted and batteries 56 (shown in FIG. 4) are charged thereby providing a warning to the rider that if throttle lever 32 is pulled, scooter 10 will move.

Brake lever 34 serves multiple functions including activating front friction brake 40, disabling throttle lever 32 and converting motor 24 into an electronic brake. As shown in FIGS. 1 and 2, brake lever is directly coupled to friction brake 40 by brake cable 38. Thus, friction brake 40 is deployed to slow scooter 10 when brake lever 34 is pulled. Simultaneously, this also serves to disable throttle lever 32 (so that motor 24 does not respond to pulling throttle lever 32) and converts motor 24 into an electronic brake on rear wheel 22. Brake lever sensor 48 mounted on brake lever 34 senses when brake lever 34 is pulled and sends a signal via brake sensor cable 46 to motor control circuit 100 (shown in FIG. 4), which disables throttle lever 32 and converts motor 24 into an electronic brake as is explained below with respect to FIG. 6. Brake sensor 48 may be a magnetic switch, a micro switch or the like.

FIGS. 1 and 2 depict scooter 10 in the riding position. In contrast, FIG. 3 depicts scooter 10 in the stowed position. When collar 57 is raised to expose joint 58, steering column 28 folds at joint 58 to allow steering column 28 to bend approximately 90 degrees downward toward platform 12. Handle 26 slides into stowage hook 30 to enable scooter 10 to be easily carried by steering column 28. When scooter 10 is folded in the stowed position, hook 30 also serves as a handle for pushing or pulling scooter 10. Holding hook 30 so that rear wheel 22 is off the ground enables scooter 10 to be pushed or pulled with front wheel 20 rolling along the ground. Since handle 26 is held in place by hook 30, steering column and thus front wheel 20 are maintained in a straight, locked, unmoving position to allow scooter 10 to roll easily along the ground in a straight line.

FIG. 3A shows motor 24 and stowage hook 30 in greater detail. Stowage hook 30 is shaped like an inverted "J" with each end mounted by bolts 60 to extensions 62 on motor 24.

FIG. 4 shows the contents of battery pan 50 with platform 12 removed. As shown, throttle cable 36 and conduit 45

(housing brake sensor cable 46 and key cable 44) pass into and extend along the length of battery pan 50 proximate and parallel to chassis 14 in channel 64 which is created by the space between battery pan 50, platform 12 and batteries 56. Key cable 44 is coupled to motor control circuit 100. Throttle cable 36 is mounted to battery pan 50 by cable sleeve mount 66 proximate to motor control circuit 100. The inner cable 68 extends from cable sleeve mount 66 and is attached to one end 70a of pivot mount 70 Spring 72 is coupled to the other end 70b of pivot mount 70 and to cable sleeve mount 66 in order to bias depression of throttle lever 32. Pulling throttle lever 32 causes inner cable 68 to pull end 70a resulting in counter clockwise rotation of pivot mount 70 and causes spring 72 to stretch. When throttle lever 32 is released, spring 72 compresses from its stretched position back to its original un-stretched length causing spring 72 to pull end 70b. This results in clockwise rotation of pivot mount 70 back to its resting position.

As shown in FIG. 5, pivot mount 70 is coupled to mechanical potentiometer 74 which in turn is coupled to pulse width modulated power controller 102 in motor control circuit 100 to provide variable acceleration of scooter 10. Throttle sensor 76, which is mounted on motor control circuit 100 and proximate to pivot mount 70, senses when pivot mount 70 is in its resting position (i.e., throttle lever 32 is not being pulled to accelerate scooter 10). When throttle lever 32 is pulled thus rotating pivot mount 70, metal flag 78 rotates out of throttle sensor 76, which may be an optical sensor, magnetic sensor or the like). This information is sensed by throttle sensor 76 and conveyed to motor control circuit 100 in order to provide allow power to flow to motor 24. As will be explained in more detail with respect to FIG. 6, this is a safety feature that prevents unwanted acceleration of scooter 10 in the event of failure of electronic components in motor control circuit 100. Motor control circuit 100 is coupled to motor 24 via control cables 80. The circuitry of motor control circuit 100 is explained in detail with respect to FIG. 6.

Also contained in battery pan 50 are four batteries 56 which are 6 volt lead acid batteries. Batteries 56 can also be NiCad, lithium ion batteries or any other type of electrical fuel source (such as fuel cells). As explained with respect to FIG. 9, use of fuel cells enables an alternate arrangement of platform 12. Batteries 56 are evenly distributed on each side of chassis 14 and placed low in battery pan 50 in order to ensure an evenly distributed low center of gravity. Batteries 56, which are coupled in series from each negative to positive terminal by battery cables 82 to provide electrical power to motor control circuit 100. Batteries 56 are also coupled to charging unit 84 by charging cables 86 so that batteries 56 may be charged when charging unit 84 is connected to an AC power source.

Batteries 56 are re-charged by charging unit 72 which converts AC power to DC power. While charging unit 84 is receiving AC power, motor control circuit 100 disables motor 24 as a safety pre-caution based upon the 30V DC signal that is distributed to batteries 56 via charging cables 86, motor control circuit 100 and battery cables 82. The AC power is supplied from any wall outlet via a power cord 85 which is coupled to socket 88 mounted on battery pan 50. Charging unit 84 dissipates heat via heat coupler 90 (consisting of an aluminum bar) to battery pan 50 which acts an integrated heat sink. Battery pan 50 is constructed of aluminum in order to facilitate its use as a heat sink to dissipate heat. Aluminum is the preferred choice given its light weight, heat sink capability, RF shielding properties and low cost. The use of a heat sink is necessary to prevent overheating since charging unit 84 is located in a closed environment in battery pan 50 covered by platform 12. Transistors (not shown) in charging unit 84 are principally responsible for the generation of heat during charging. Without a heat sink, platform 12 would have to be removed during charging or venting would have to be placed in either battery pan 50 or platform 12, which would degrade the strength of these structures. In addition to acting as a heat sink, battery pan 50 serves as an RF shield for the electronic circuitry in motor control circuit 100 and charging unit 84, since battery pan is constructed of aluminum. Thus, battery pan 50 serves multiple integrated purposes including a battery and electronics holder and protector, an RF shield and a heat sink.

Motor control circuit 100 is depicted in FIG. 6. Pulse width modulating controller 102 is coupled to mechanical potentiometer 74 which senses the position of pivot mount 70 to provide variable control of motor 24. As pivot mount 70 rotates counter clockwise from its rest position when throttle lever 32 is pulled, mechanical potentiometer 74 senses the position and conveys the information to throttle pulse width modulating controller 102 which provides a variable DC voltage to motor 24 via line 104. As a safety measure, throttle sensor 76 (which as depicted is an optical sensor) senses the movement of pivot mount 70 via corresponding movement of metal flag 78 and allows power to flow to motor 24 by closing relay 106. This safety measure protects against failure of throttle MOSFET transistor 108. Typically, when MOSFET transistors fail, they fail in the "on" position which in the present circuit would cause full acceleration by motor 24 when throttle lever 32 is not being pulled. Thus, if throttle MOSFET transistor 108 fails in the "on" position, motor 24 will not accelerate when throttle lever 32 is not being pulled.

Key 42 is coupled via key cable 46 to ignition pin #4 on connector 120. Removing key 42 opens the circuit along ignition line 110. As a result, power is cut-off to all integrated circuits in motor control circuit 100 and motor 24. This serves to disable throttle lever 32 and prevents power being supplied to motor 24 to deter theft of scooter 10. Also, battery life is conserved by removing power to all integrated circuits.

As a further safety measure, motor control circuit 100 is coupled to charging unit 84 via charging cables 86. The charging potential generated by charging unit 84 is passed to motor control circuit 100 via cables 86 which are coupled to connector 112. The charging potential at connector 112 is electrically coupled to shutdown pin (#10) on pulse width modulating controller 102 via line 114. This disables throttle lever 32. The charging potential is applied to batteries 56 via battery cables 82 which are coupled to battery terminals 116. When in non-charging mode, the potential from batteries 56 is prevented from shutting down pulse width modulating controller 102 (via pin #10) by diode 118.

As explained above, brake lever 34 serves to disable throttle lever 32 (so that motor 24 does not respond to pulling throttle lever 32) and converts motor 24 into an electronic brake on rear wheel 22. Brake lever sensor 48 mounted on brake lever 34 senses when brake lever 34 is pulled and sends a signal via cable 46 which is received at pin #2 on connector 120 on motor control circuit 100. The presence of the signal causes transistor drive integrated circuit 104 to ignore pulse width modulating controller 102 (i.e., disable throttle lever 32). Additionally, the presence of the signal causes pulse generation integrated circuit 122 to output a 12 Hz 65% duty cycle to braking MOSFET drive integrated circuit 124. This switches braking MOSFET transistor 126 on and off at a 12 Hz frequency. When braking MOSFET transistor 126 is on, it shorts the windings of motor 24 by connecting the positive and negative motor terminals 128a and 128b. When shorted, spinning motor 24 generates feed back current. The feed back current causes motor 24 to act as an electronic brake. A duty cycle of 12 Hz is preferred since it is sufficiently rapid that the switching motor braking on and off will not be noticed by the rider. Additionally, a 65% on (i.e., shorted or braking) duty cycle is preferred to ensure that the coefficient of friction between rear wheel 22 and riding surface S is not exceeded.

Not only does motor 24 provide electronic braking, the braking includes an anti-lock braking system. When motor 24 acts as an electrical brake, motor drive shaft 25 is maintained in frictional engagement with rear wheel 22. Thus, the rotational speed of motor drive shaft 25 is proportional to the rotational speed of rear wheel 22. In turn, the braking force generated by motor 24 is proportional to the rotational speed of motor drive shaft 25 and therefore rear wheel 22. If the rotational speed of rear wheel 22 is reduced, as in a skid the braking force is also reduced thus preventing wheel lock. Additionally, if the braking force does cause rear wheel 22 to start sliding over surfaces during the 65% on cycle, the sliding will cease during the 35% off cycle when no braking force is applied. Also, unlike automobile anti-lock braking systems, the present invention does not need a sensor like in automobile's because the anti-lock mechanism is on all of the time. This reduces the complexity and cost of the circuitry employed in the present invention.

During braking, rotation of motor drive shaft 25 is caused by the forward momentum of scooter 10 rather than motor control circuit 100 and batteries 56. This reverse force can be used as regenerative power to recharge batteries 56 during braking. This prolongs battery life between charges thereby increasing the range of scooter 10.

Also, included in motor control circuit 100 is current limit circuit 130. When scooter 10 is stationary or moving slowly, there is very little back electromagnetic force (EMF) from motor 24 and the current. Thus, if the current is not limited, the current would exceed the current rating of motor 24, the electronic components in motor control circuit 100 including the wiring and drive transistors. Current limit circuit 130 is a pulse-by-pulse current limiter because if the current exceeds the threshold during an on pulse, that pulse is terminated (i.e., the MOSFET is turned off). The next pulse does not effect the previous pulse which was terminated. Of note, pulses occur 17,000 times per second.

In current limit circuit 130 the current is sensed by measuring the voltage drop across MOSFET 108. This voltage is proportional to the current because the "on resistance" of the MOSFET is approximately constant. The voltage is then compared to a set threshold and MOSFET 108 is turned off if the voltage exceeds the threshold thus stopping the current flow.

The conventional manner of measuring current is by measuring the voltage drop across a current sense resistor. Although the conventional manner could be employed in the present invention, it is not efficient to do so. A current sense resistor, if employed in high current present invention, would create excess heat and waste energy. This would require a current sense resistor that has a very small value and/or has high precision. Either of these characteristics is only found in expensive (i.e., not cost effective) resistors.

In current limit circuit 130 when in operation, as described in reference to FIG. 6, MOSFET 108 is turned off (non-conducting) by pulse width modulating controller 102 by turning outputs CA (pin 12) and CB (pin 13) off. This causes pin 2 of U5 to go high which causes pin 2 (the gate) of MOSFET 108 to go low. Diode D5 does not conduct and therefore pin 1 and pin 2 of resistor R17 goes to zero volts and pin 4 of pulse width modulating controller 102 is zero volts resulting in the current limit to be turned off.

When pulse width modulating controller 102 turns MOSFET 108 on (conducting) by turning outputs CA (pin 12) and CB (pin 13) on which cause pin 2 of U5 to go low which causes pin 2 (the gate) of MOSFET 108 to go high. Diode D5 conducts and the voltage between R14 and R15 is pulled down to the voltage at pin 2 (the source) of MOSFET 108 plus the voltage drop across diode D5. Since the "on resistance" of MOSFET 108 is fairly constant (0.007 ohms), the voltage drop across pin 2 and pin 3 of MOSFET 108 is proportional (as is the voltage between R14 and R15) to the instantaneous current through motor 24. Resistors R15 and R17 form a voltage divider whose output (pin 2 of resistor R17) can be adjusted so that when the desired threshold current is exceeded, the voltage at pin 2 of resistor R17 exceeds the threshold voltage (200 mV) of the current limit circuit in pulse width modulating controller 102 and MOSFET 108 is turned off.

The integrated electronic control of the present invention is summarized in FIG. 7. The circuitry on motor control circuit 100 controls the operation of scooter 10 based upon events at charging unit 84, anti-theft key 42, throttle lever 32 and brake lever 34. Power cut-off circuitry 142 shuts off power when key 42 is removed. Also, LED light 54 provides a warning when key 42 is in place and batteries 56 are charged. Throttle control 144 controls acceleration of scooter 10 based upon the movement of throttle mechanism 140 caused by throttle lever 32. Throttle mechanism 140 converts the mechanical movement of throttle lever 32 to electrical signals recognized by throttle control 144. Throttle control 144 may be disabled by charging unit 84 or brake sensor 48 which senses the position of brake lever 34. Safety circuit 146 protects against failure of throttle control 144 based on throttle sensor 76 which senses the position of throttle mechanism 140. Electronic brake control 148, coupled between motor 24 and brake sensor 48, converts motor 24 into an electric brake when brake sensor 48 senses that brake lever 34 is pulled.

The present invention includes a dual suspension system which is depicted in detail in FIGS. 8 and 9. The dual suspension solves the problems associated with non-pneumatic tires, by eliminating the rough ride normally caused by the hardness of the tires. Also, as depicted in FIGS. 8 and 9, both front suspension mount 16 and rear suspension mount 18 have a cantilevered construction, which locates the suspension mounts on one side only of front and rear wheels 20 and 22. This facilitates easy removal and replacement of front and rear wheels 20 and 22.

Front suspension wheel mount 16, as depicted in FIGS. 8A and 8B, is formed by cantilevered support 160, pivot link 162, spring 164 (which may be any type of suspension member such as a shock or strut), and spring support 166. Cantilevered support 160 is mounted at its proximal end 160a to steering column 28 and pivotally coupled at its distal end 160b to pivot link 162 by bearing joint 168. Pivot link 162 is also pivotally mounted at its other end 162a to front axle assembly 170. Spring 164 is mounted between front axle assembly 170 and spring support 166 which extends perpendicularly from proximate to proximal end 160a of cantilevered support 160. Spring locating lugs 172a and 172b center and hold spring 164 between front axle assembly 170 and spring support 166.

FIG. 8A depicts front suspension wheel mount 16 in its normal riding position where spring 164 is compressed to bare the weight of scooter 10 and the rider. When scooter 10 hits a bump B in riding surface S, front suspension wheel mount 16 absorbs the shock caused by bump B as depicted in FIG. 8B. Spring 164 compresses to allow front wheel 20 to rise from surface S without movement of cantilevered support 160, steering column 28 and the remainder of scooter 10. The movement of front wheel 20 is isolated by the clockwise rotation of pivot link 162 about bearing joint 168 as spring 164 compresses. As front wheel 20 passes bump B, spring 164 gradually decompresses back to the position shown in FIG. 8A.

Rear suspension wheel mount 18, as depicted in FIGS. 9A and 9B, is formed by horizontal pivot link 180, swing arm spring support 182, spring 184 and chassis spring support 185. Cantilevered swing arm 180 is pivotally mounted by swing arm pivot 188 at its proximal end 180a to angular chassis extension 14a and mounted at its distal end 180b to rear wheel axle assembly 186. Spring support 182 extends vertically upward from horizontal pivot link 180 proximate to proximal end 180b. Spring 184 (which may be any type of suspension member such as a shock or strut) is mounted between swing arm spring support 182 and chassis spring support 185. More than one spring 184 may be used to provide sufficient suspension. The preferred embodiment, as can be seen in the perspective view of FIG. 3A, utilizes two springs 184. Spring locating lugs 192a and 192b center and hold spring 184 between chassis spring support 185 and swing arm spring support 182.

Motor 24 is pivotally mounted to pivot bushing 190 on the distal end of swing arm spring 182. This allows motor shaft 25 (not shown in FIG. 9) to travel with and maintain driving engagement with rear wheel 22. To further assist the driving engagement, motor shaft 25 is biased against rear wheel 24 by bias spring 27 mounted between motor 24 and cantilevered swing arm 180.

Swing arm pivot is surrounded by travel limiter 194 which limits the maximum expansion and compression of spring 184 and thus the distance that cantilevered swing arm 180 may travel. The expansion limit (i.e., clockwise rotation or downward movement of cantilevered swing arm 180) prevents spring 184 from falling out of spring locating lugs 192 when scooter 10 is being rolled in the stow and carry position of FIG. 3. While being rolled, excessive clockwise rotation front the rider raising hook 30 off the ground could exceed the expansion limit of spring 184 causing spring 184 to fall out of place if not for travel limiter 194.

FIG. 9A depicts rear suspension wheel mount 18 in its normal riding position where spring 184 is compressed to bare the weight of scooter 10 and the rider. When scooter 10 hits a bump B in riding surface S, rear suspension wheel mount 18 absorbs the shock caused by bump B as depicted in FIG. 9B. Spring 184 compresses to allow rear wheel 22 to rise from surface S without movement of angular chassis extension 14a and the remainder of scooter 10. The movement of rear wheel 22 is isolated by the counterclockwise rotation of cantilevered swing arm 180 about swing arm pivot 188 as spring 184 compresses. As rear wheel 22 passes bump B, spring 184 gradually decompresses back to the position shown in FIG. 9A.

If fuel cells are used, an alternate configuration of the riding platform is possible as shown in FIGS. 10A and 10B. Fuel cells may be manufactured to virtually any size and strength specification, unlike conventional lead acid batteries. Thus, fuel cell 200 is approximately 3" thick and the same length and width as platform 12 in FIG. 1. Moreover, fuel cell 200 is constructed with a sufficiently hard casing to support a rider and protect the contents of the fuel cell 200. A protective enclosure 202 is mounted on the underside of fuel cell 200 proximate to motor 24 to enclose and protect motor control circuit 100 and charging unit 84. Fuel cell 200 may use any hydrogen rich fuel, which is contained in tank 204. In the event a fuel other than hydrogen is utilized, an on-board converter (not shown) will be required to convert the fuel to hydrogen (i.e., separate the hydrogen from the fuel).

The cables for brake sensor 48, key 42 and throttle lever 34 are channeled through either chassis 14 which is a hollow tube or conduit 206 passing along side chassis 14 to protective enclosure 202. Fuel cell 200 is mounted to chassis 14 by one or more triangular trusses which are positioned between the underside of fuel cell 200 (the side facing riding surface S) and chassis 14.

From the above description, it will be apparent that the invention disclosed herein provides a novel and advantageous electric scooter. The foregoing discussion discloses and describes merely exemplary methods and embodiments of the present invention. One skilled in the art will readily recognize from such discussion that various changes, modifications and variations may be made therein without departing from the spirit and scope of the invention. Accordingly, disclosure of the present invention is intended to be illustrative, but not limiting, of the scope of the invention, which is set forth in the following claims.

We claim:

1. An electric scooter for powered movement of a rider over a ground surface comprising:

a chassis having a front end and a rear end;

a steering column rotatably mounted on the front end of the chassis;

a handle bar mounted at one end of the steering column a front wheel rotatably mounted on another end of the steering column;

a rear wheel rotatably mounted on the rear end of the scooter chassis a fuel cell or series of fuel cells wherein the fuel cell or cells provides both a charge for accelerating an electric motor and provides a surface or platform for supporting the rider of the scooter.

2. The electric scooter recited in claim 1 further comprising:

a fuel supply tank coupled to the fuel cell or fuel cells and mounted proximate to the rear of the chassis.

* * * * *

UNITED STATES PATENT AND TRADEMARK OFFICE
CERTIFICATE OF CORRECTION

PATENT NO.      : 6,609,584 B2                                       Page 1 of 1
DATED           : August 26, 2003
INVENTOR(S)     : Steven J. Patmont and Timothy Chow It is certified that error appears in the above-identified patent and that said Letters Patent is hereby corrected as shown below:

Title page,
Item [22], Filed, replace "Sep. 5, 2001" with -- Sep. 4, 2001 --.

Column 10,
Line 49, after "scooter chassis" add -- ; and --.

Signed and Sealed this

Twentieth Day of January, 2004

JON W. DUDAS
*Acting Director of the United States Patent and Trademark Office*